United States Patent Office 3,513,056
Patented May 19, 1970

3,513,056
STRUCTURAL BONDING USING BRANCHED BLOCK COPOLYMERS
Terence C. Middlebrook, Bartlesville, Okla., assignor to Phillips Petroleum Company, a corporation of Delaware
No Drawing. Filed Jan. 13, 1966, Ser. No. 520,364
Int. Cl. C09j 5/06; B32b 15/04
U.S. Cl. 156—309                                         3 Claims

ABSTRACT OF THE DISCLOSURE

Branched block rubbery copolymers produced from a conjugated diene and a vinyl-substituted aromatic compound wherein the terminal blocks of the branches of the polymer contain polyvinyl-substituted aromatic compound are employed for bonding structural materials together.

This invention relates to bonding structural materials together. In one aspect this invention relates to a method for bonding certain structural materials together. In another aspect this invention relates to bonds formed between structural materials and a bonding agent comprising a branched copolymer.

Many adhesive and cementing compositions have been suggested in the art for bonding structural materials together. Most adhesive and cementing compositions comprise a solution of a bonding agent and a solvent. The solution is applied to the surfaces of the materials that are to be bonded together and the solvent is allowed to evaporate. Such methods for bonding structural materials together present various problems. For example, it is necessary to allow the solvent-adhesive composition to "set" for a relatively long length of time in order for the solvent to evaporate. Many times there is a tendency, on the part of the solvent-adhesive composition, to undergo shrinking as the solvent is evaporated.

An object of this invention is to provide a method for bonding structural materials together to produce a high-strength bond.

Other aspects, objects and advantages of this invention will be apparent to those skilled in the art upon careful study of the disclosure and the appended claims.

I have discovered that certain structural materials can be bonded together by using a branched block copolymer as the bonding agent. The branched block copolymer used as the bonding agent in my invention is a branched block copolymer of a conjugated diene and a vinyl-substituted aromatic compound. The branched block copolymer contains terminal polymer blocks of the vinyl-substituted aromatic compound.

The branched block copolymers that are used as bonding agents in my invention have at least three relatively long branches which radiate from a nucleus. The terminal polymer blocks on each of these branches are composed of the vinyl-substituted aromatic compound. The branched block copolymers that are suitable for use in my invention can be formed by any method known in the art.

One convenient way of forming the branched block copolymers used as bonding agents of this invention is by polymerizing the vinyl-substituted aromatic compound in the presence of an organomonolithium initiator. After the vinyl-substituted aromatic compound has been polymerized to form the initial polymer block, the conjugated diene can be added to the polymerization mixture to produce a block copolymer of the conjugated diene and the vinyl-substituted aromatic compound. By following the procedure of polymerizing the vinyl-substituted aromatic compound first, followed by the addition of the conjugated diene compound, a block copolymer having a terminal lithium atom is formed. The lithium atom will be at the end of the conjugated diene polymer block. The lithium-terminated block copolymer is called a "living polymer" because of the presence of the lithium atom at the end of the conjugated diene polymer block. The living polymer can then be conveniently reacted with a polyfunctional compound having at least three reactive sites that are capable of reacting with the carbon-lithium bond of the living polymer. By regulating the amounts of the living polymer and the amounts of the polyfunctional compound, it is possible to produce a branched block copolymer having at least three relatively long polymer branches extending outwardly from the nucleus. The nucleus or hub is formed by the polyfunctional compound which reacted with the lithium-terminated polymer. In order to produce the branched block copolymers having at least three polymer branches, it is essential that the polyfunctional compound have at least three reactive sites that are capable of reacting with the carbon-lithium bond of the living polymer.

To achieve maximum branching, stoichiometric amounts of polyfunctional compound are reacted with the living polymer. By using stoichiometric amounts of the polyfunctional compound, each reactive site on the polyfunctional compound will react with a carbon-lithium bond in the living polymer. Larger amounts of the polyfunctional compound encourage the production of polymers that are coupled in a linear configuration instead of being branched. When stoichiometrically equivalent amounts of the polyfunctional compound and the living polymer are reacted, the final product comprises a branched polymer in which the polymer chain is joined at one end to each reactive site of the polyfunctional compound.

Since the branched block copolymers used as bonding agents in this invention preferably contain terminal homopolymer blocks of the vinyl-substituted aromatic compound, it is necessary that at least a portion of the vinyl-substituted aromatic compound be polymerized first when an organomonolithium initiator is used to form the block copolymer. When the vinyl-substituted aromatic compound has been polymerized to the desired length, any unreacted vinyl-substituted aromatic compound can be removed. Then the conjugated diene is added to the polymerization mixture and the polymerization is continued until the conjugated diene has been polymerized to the desired amount. The living polymer of the vinyl-substituted aromatic compound and the conjugated diene can then be reacted with the polyfunctional compound to produce the branched block copolymer. In some instances, it may be desirable to form other polymer blocks before the living polymer is reacted with the polyfunctional compound. This is very easily accomplished by simply adding additional monomer increments to produce additional polymer blocks before the living polymer is reacted with the polyfunctional compound. Thus, it is possible to produce block copolymers having 2, 3 or more separate and distinct polymer blocks by the above procedure.

The vinyl-substituted aromatic compounds that can be used in producing branched copolymers for use in the bonding agent of this invention are: styrene, 1-vinylnaphthalene, 2-vinylnaphthalene and the alkyl, cycloalkyl, aryl, alkaryl, and aralkyl derivatives thereof in which the total number of carbon atoms in the combined constituents is generally not greater than 12. Examples of such substituted monomers include: 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, and the like.

The conjugated dienes used in the production of branched copolymers for use as bonding agents of this invention are those which contain from 4 to 12 carbon atoms per molecule. The conjugated dienes containing from 4 to 8 carbon atoms are preferred. Examples of such compounds include 1,3-butadiene, isoprene, 2,3-dimethyl- 1,3-butadiene, piperylene, 3-butyl-1,3-octadiene, 1-phenyl-1,3-butadiene, and the like.

The relative amounts of the vinyl-substituted aromatic compound and the conjugated diene used in producing the branched block copolymers described above can vary over a wide range. I have found that the amount of conjugated diene present in the branched block copolymer can be from 40 to 95 parts by weight per 100 parts of the branched block copolymer. The vinyl-substituted aromatic compound can be present in the range of from 5 to 60 parts by weight per 100 parts of the branched block copolymer. Preferably, the conjugated diene will be present in an amount of from 50 to 90 parts by weight per 100 parts of the branched block copolymer.

The amount of vinyl-substituted aromatic compound that is present as terminal polymer blocks in the branched block copolymers used in this invention can vary over a wide range. I have found that it is desirable to have at least 5 parts by weight of the vinyl-substituted aromatic compound present in terminal homopolymer blocks for every 100 parts by weight of the branched block copolymer. The vinyl-substituted aromatic compound can be polymerized for a period of time to produce a polymer block of the vinyl-substituted aromatic compound of sufficient size followed by a second polymerization step wherein the conjugated diene is polymerized. In some instances it may be desirable to allow all of the vinyl-substituted aromatic compound to be polymerized before adding the conjugated diene for the second polymerization step. In other instances, any unreacted vinyl-substituted aromatic compound can be removed from the polymerization mixture followed by the addition of the conjugated diene for the second polymerization step. And in still other instances, any unreacted vinyl-substituted aromatic compound can be left in the polymerization system and the conjugated diene can be added for the second polymerization step. In the latter instances, the polymer block formed in the second polymerization step may contain both conjugated diene monomer units and vinyl-substituted monomer units.

It is preferable that the terminal polymer blocks on the branched block copolymer be homopolymer blocks of the vinyl-substituted aromatic compound. It is also within the scope of this invention to utilize branched block copolymers with terminal polymer blocks that are predominantly vinyl-substituted aromatic polymers with minor amounts of the conjugated diene monomer units. When the terminal polymer blocks are composed of both vinyl-substituted aromatic units and conjugated diene units, the conjugated diene comprises less than 20 parts by weight for each 100 parts by weight of the terminal polymer block, with the vinyl-substituted aromatic comprising the remainder.

Any organomonolithium initiator known in the art can be used in making the above-described polymers. Examples of such initiators include methyllithium, n-butyllithium, n-decyllithium, phenyllithium, naphthyllithium, p-tolyllithium, cyclohexyllithium, and the like.

The amount of initiator used varies depending upon the desired moecular weight of the end polymer product. The branched block copolymers used in my invention can vary from relatively low molecular weight rubbers up to polymers having a molecular weight of 500,000 and higher. The initiator level for making the branched block copolymers used in my invention is commonly in the range between 0.25 and 40 gram millimoles per 100 grams of monomers.

The polymerization is normally carried out at a temperature in the range between —100 and +150° C., preferably between —75 and +75° C. A diluent can be used such as the hydrocarbons illustrated by benzene, toluene, cyclohexane, isooctane, and the like, and mixtures thereof. These diluents are normally paraffins, cycloparaffins, or aromatics containing from 4 to 10 carbon atoms per molecule. Polar solvents such as ethyl ether, tetrahydrofuran, and the like can also be used as diluents. Mixtures of the foregoing diluents can also be used. The resulting polymer contains a very high percentage of molecules in which a lithium atom is positioned at one end, although any impurities present, such as water or alcohol, will tend to reduce the amount of lithium terminated polymer formed.

At the conclusion of the polymerization, the polyfunctional treating agent which contains at least three reactive sites is added to the unquenched reaction mixture. This agent must be added before any material such as water, acid or alcohol is added to inactivate and/or remove the lithium atoms present in the polymer. The temperature of this reaction can vary over a broad range and is conveniently the same as that used for the polymerization. Ordinarily the higher temperatures are preferred for this reaction, for example, from room temperature up to 150° C. and above. Temperatures above 35° C. are preferred for rapid reaction. Under such conditions, the reaction normally occurs as soon as the materials are blended and the reaction time is quite short, for example, in the range of 1 minute to 1 hour. Longer reaction periods are required at the lower temperatures.

The polyfunctional reagent which is reacted with the lithium terminated polymer must contain at least three reactive sites which are capable of reacting with the lithium-carbon bond in the polymer and thereby produce the branched polymers. Types of treating agents which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups or isocyanate and halide groups.

While any polyepoxide can be used, I prefer those which are liquid since they can be readily handled and form a relatively small nucleus for the radial polymer. Especially preferred among the polyepoxides are the epoxidized hydrocarbon polymers such as epoxidized liquid polybutadiene and the epoxidized vegetable oils such as epoxidized soybean oil and epoxidized linseed oil. Other epoxy compounds such as 1,2:5,6:9,10-triepoxydecane, and the like, can also be used.

The polyisocyanates are preferably those compounds represented by the formula $R(NCO)_m$ where R is a polyvalent organic radical which can be aliphatic, cycloaliphatic, or aromatic and contains from 2 to 30 carbon atoms and $m$ is an integer of at least 3. Examples of such compounds include benzene - 1,2,4-triisocyanate, naphthalene - 1,2,5,7 - tetraisocyanate, triphenylmethane-triisocyanate, naphthalene - 1,3,7 - triisocyanate, and the like. Especially suitable is a commercially available product known as PAPI-1. This material is a polyarylpolyisocyanate having an average of 3 isocyanate groups per molecule and an average molecular weight of about 380. Structurally the compound can be represented by a series of isocyanate-substituted benzene rings joined through methylene linkages.

The polyimines which are also known as polyaziridinyl compounds are preferably those containing 3 or more aziridine rings as represented by the formula:

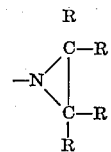

wherein each R can be hydrogen, alkyl, aryl or cycloalkyl radicals or composites of these hydrocarbon radicals, the total of the R groups containing up to 20 carbon atoms. The aziridine rings can be attached to a carbon, phosphorous or sulfur atom. Examples of these compounds are the triaziridinyl phosphine oxides or sulfides such as tri(1 - aziridinyl)phosphine oxide, tri(2 - methyl - 1- aziridinyl)phosphine oxide, tri(2 - ethyl - 3 - decyl-1 aziridinyl)phosphine sulfide, tri(2 - phenyl - 1 - aziridinyl)phosphine oxide, tri(2 - methyl - 3 - cyclohexyl-1 - aziridinyl)phosphine sulfide, and the like. Also suitable are the triaziridinyl-substituted triazines and the triphosphatriazines containing 3, 4, 5, or 6 aziridinyl-substituted rings. Examples of these compounds include 2,4,6-tri(aziridinyl) - 1,3,5 - triazine, 2,4,6 - tri(2 - methyl - 1 - aziridinyl)1,3,5 - triazine, 2,4,6 - tri(1 - aziridinyl)2,4,6-triphospha - 1,3,5 - triazine, 2,4,6 - tri(2 - methyl-n-butylaziridinyl) - 2,4,6 - triphospha-1,3,5-triazine, and the like.

The polyaldehydes are represented by compounds such as 1,4,7-naphthalene tricarboxylaldehyde, 1,7,9-anthracene tricarboxylaldehyde, 1,1,5-pentane tricarboxylaldehyde, and similar polyaldehyde-containing aliphatic and aromatic compounds.

The polyketones can be represented by compounds such as 2,4,6-heptanetrione, 1,4,9,10-anthracenetetrone, 2,3-diacetonylcyclohexanone, and the like.

Examples of the polyanhydrides include pyromellitic dianhydride, styrene-maleic anhydride copolymer, and the like.

Examples of the polyesters are the glycerol tristearates, glycerol trioleates, and similar compounds.

Among the polyhalides, I prefer the silicon tetrahalides such as silicon tetrachloride, silicon tetrabromide and silicon tetraiodide. The trihalosilanes such as trifluorosilane, trichlorosilane, trichloroethylsilane, tribromobenzylsilane, and the like can also be used. Also preferred are the polyhalogen-substituted hydrocarbons such as 1,3,5-tri(bromomethyl)benzene, 2,5,6,9 - tetrachloro-3,7-decadiene, and the like, in which the halogen is attached to a carbon atom which is alpha to an activating group such as an ether linkage, a carbonyl group, or a carbon-to-carbon double bond. Substituents which are inert with respect to lithium atoms in the terminally reactive polymer can also be present in the active halogen-containing compounds. Alternatively, other suitable reactive groups different from the halogen as described above can be present. Examples of compounds containing more than one type of functional group include 1,3 - dichloro-2-propanone, 2,2-dibromo - 3 - decanone, 3,5,5 - trifluoro - 4 - octanone, 2,4 - dibromo - 3 - pentanone, 1,2:4,5 - diepoxy-3-pentanone, 1,2:4,5 - diepoxy - 3 - hexanone, 1,2:11,12-diepoxy - 8 - pentadecanone, 1,3:18,19 - diepoxy - 7,14-eicosanedione, and the like.

It can be seen from the above description of suitable polyfunctional compounds that a vast number of possible reagents are available. In general the compounds are organic or, in the case of the silicon halides, have a silicon base. They are liquids and/or have relatively low molecular weights, for example, less than 2,000. Also the compounds are relatively free of other reactive groups which would compete with the groups named above for reaction with the lithium-carbon bond.

The foregoing procedure represents only one preferred method for preparing the branched block copolymers used in my invention. It is also possible to produce the branched block copolymers using polylithium initiators having the formula $RLi_x$ wherein R is a hydrocarbon group having up to 20 carbon atoms and $x$ is 3 or 4. By using the above-mentioned polylithium initiators and polymerizing the conjugated diene first, followed by the vinyl-substituted aromatic compound, branched block copolymers containing 3 or 4 distinct polymer branches, respectively, can be produced. The polymers will have the vinyl-substituted aromatic compound in the terminal polymer blocks with the conjugated diene in the internal polymer blocks. These blocks can have compositions such as that described above wherein the polymers made with monolithium initiator are reacted with the polyfunctional compound.

The high-strength bonds formed by my invention are formed by placing a layer of the above-described branched block copolymer between the structural materials that are to be bonded together. The two structural elements, with the branched block copolymers "sandwiched" between, are then subjected to heating that is sufficient to heat the branched block copolymer layer up to a temperature in the range of from about 250° to 400° F. As a result of the heating step, the structural elements are securely bonded together with the branched block copolymer. It is not particularly necessary to subject the bond to prolonged heating, so long as the temperature of the branched block copolymer does reach the desired 250° to 400° F. range. In some instances, to form a tight bond, it may be desired to subject the bond to pressure during the heating step. However, it is not necessary in all cases to subject the bond to excessive pressures during the heating step, so long as there is actual contact between the structural members and the branched block copolymer.

Since the bonds of my invention are formed by heating a laminate of the materials to be bonded together and the branched block copolymer, it is necessary that the structural members be heat resistant. My invention is applicable for bonding such heat-resisting structural materials as metals, glass, ceramics, masonry, heat-resisting polymeric materials and the like.

It is also within the scope of my invention to include various other components in the branched block copolymer bonding agent. For example, in some instances it may be desirable to add such materials as pigments, antioxidants, softeners, curatives, vulcanizing agents, reinforcing agents, and fillers to the branched block copolymer prior to the bonding.

The following example is submitted to illustrate a preferred embodiment of my invention. The example is not to be considered as unduly limiting of the scope of my invention. Various modifications and changes can be made in the foregoing specification without departing from the scope and spirit of my invention.

EXAMPLE

A series of runs was made to evaluate the bonding strength of natural rubber, a butadiene-styrene emulsion copolymer, and a branched block copolymer when used to bond stainless steel blocks together. The branched block copolymer used in the tests was a 50/50 blend of polymers prepared using the following recipe and conditions:

| | Parts by weight |
|---|---|
| Cyclohexane | 860 |
| Styrene | 25 |
| Butadiene | 75 |
| n-Butyllithium | 0.14; 0.16 |
| Oxiron 2000 [1] | 0.5 |

[1] Liquid epoxidized polybutadiene with a pale amber color, a viscosity of 1800 poises at 25° C., a specific gravity of 1.01, an epoxy content of 9.0 percent (oxirane oxygen), and an epoxy equivalent of 177.

Polymerization was initiated at 25 p.s.i.g. and 125° and 135° F. respectively with only styrene present, and was allowed to continue for 60 minutes, during which the temperature peaked at 150° and 140° F., in 45 and 40 minutes, and dropped to 148° and 138° F., respectively. Butadiene was then added, and polymerization was continued for an additional 40 minutes, during which the temperature peaked at 207° and 198° F., in 20 and 30 minutes, and dropped to 203° and 195° respectively. At this time the Oxiron was added. After the reaction with the Oxiron, 1 phr. (part per 100 parts of rubber) of 2,6-di-tert-butyl-4-methylphenol was added as antioxidant, and the polymer was stripped, washed and dried. The polymer blend contained 23.4 percent total styrene, all as polystyrene (determined by the method in U.S. 3,030,346), and had a Mooney viscosity (ML–4 at 212° F., ASTM D 1646–63) of 100.

The emulsion polymer used in the runs was a 75/25 butadiene/styrene copolymer prepared by the procedure shown in ASTM D 1419-61T. The Mooney viscosity of the emulsion copolymer was 48.5 (ML-4 at 212° F.). The natural rubber was #1 Smoked Sheet.

Samples of each rubber were pressed between one-inch square sheets of stainless-steel shim stock at a temperature of 307° F., and under a force of 30 tons, for 10 minutes. The samples were then pulled on a C.R.E. Tensile Machine:

| Polymer: | Force required for separation, p.s.i. |
|---|---|
| Natural rubber | 20 |
| Emulsion copolymer | 415 |
| Branched block copolymer | 510 |

These data illustrate the superior bonds that can be achieved when using my invention.

I claim:

1. A method for bonding a first heat-resisting structural material to a second heat-resisting structural material comprising (1) disposing a binding agent consisting essentially of a layer of solid branched block rubbery copolymer of a conjugated diene and a vinyl-substituted aromatic compound having terminal polymer blocks of said vinyl-substituted aromatic compound between said first material and said second material; (2) bringing said first and second materials together to contact said branched block copolymer; and (3) heating said first and second materials and said branched block copolymer to a temperature in the range of from about 250° to 400° F. wherein said conjugated diene is present in the range of from about 40 to 95 parts by weight and said vinyl-substituted aromatic compound is present in the range of from about 5 to 60 parts by weight per 100 parts by weight of said copolymer and wherein at least 5 parts by weight of said vinyl-substituted aromatic compound is present in the terminal polymer blocks per 100 parts by weight of said block copolymer and said vinyl-substituted aromatic compound comprises at least 80 parts by weight per 100 parts by weight of the terminal polymer blocks.

2. The method of claim 1 wherein said conjugated diene is 1,3-butadiene and said vinyl-substituted aromatic compound is styrene.

3. The method of claim 2 wherein said first material and said second material are steel.

References Cited

UNITED STATES PATENTS

| 3,231,450 | 1/1966 | Riel | 156—309 XR |
| 2,701,780 | 2/1955 | Nelson et al. | 161—217 |
| 2,751,323 | 6/1956 | Pritchard et al. | 161—217 |
| 3,078,254 | 2/1963 | Zelinski et al. | 260—94.7 XR |
| 3,281,383 | 10/1966 | Zelinski et al. | 260—879 XR |

ROBERT F. BURNETT, Primary Examiner

R. H. CRISS, Assistant Examiner

U.S. Cl. X.R.

156—334; 161—217, 255; 260—879